United States Patent [19]

Hart et al.

[11] Patent Number: 5,366,577

[45] Date of Patent: Nov. 22, 1994

[54] METHOD OF MANUFACTURING A LENS FOR USE AS A PART OF AN AIRCRAFT

[75] Inventors: Robert N. Hart; David M. Trebes, both of Tulsa, Okla.

[73] Assignee: Nordam, Tulsa, Okla.

[21] Appl. No.: 34,261

[22] Filed: Mar. 22, 1993

Related U.S. Application Data

[63] Continuation-in-part of Ser. No. 791,881, Nov. 13, 1991, abandoned.

[51] Int. Cl.⁵ ............................................. B32B 31/20
[52] U.S. Cl. ..................... 156/222; 156/101; 156/102; 156/104; 156/221; 156/286; 362/382; 362/455
[58] Field of Search .............. 244/129.3, 1 R; 362/62, 362/455, 382; 428/38; 156/222, 221, 286, 101, 102, 104, 99, 108, 245

[56] References Cited

U.S. PATENT DOCUMENTS

| | | | |
|---|---|---|---|
| 2,328,032 | 8/1943 | Roper | 362/62 |
| 2,375,075 | 5/1945 | Corruth | 362/62 X |
| 2,939,186 | 6/1960 | Norwood et al. | 52/208 |
| 3,681,167 | 8/1972 | Moore | 156/104 X |
| 3,810,815 | 5/1974 | Welhart et al. | 156/104 X |
| 3,919,022 | 11/1975 | Stefanik | 156/286 X |
| 4,046,933 | 9/1977 | Stefanik | 156/107 X |
| 4,104,555 | 8/1978 | Fleming | 362/62 X |

Primary Examiner—Michael W. Ball
Assistant Examiner—Michele K. Yoder
Attorney, Agent, or Firm—Head and Johnson

[57] ABSTRACT

A method of manufacturing a lens for use as a part of an aircraft including the steps of fusion bonding a sheet of acrylic to a sheet of polycarbonate to form a sheet of laminate, cutting the laminate into a blank having a configuration required by the ultimate lens configuration, heating the blank and forming it around a mold to provide a three dimensional lens body of desired size and configuration having an uninterrupted circumferential edge and having an inner polycarbonate surface and an outer acrylic surface, applying a narrow strip seal to the lens body inner surface in a narrow strip portion adjacent substantially the full circumferential edge thereof in order to bond the strip seal to the lens body, shaping the circumferential edge of the lens body around substantially the full circumferential edge thereof, and providing bushings in the lens body and strip seal so the bushings are spaced around the circumferential edge as a means of securing the lens to an aircraft.

11 Claims, 3 Drawing Sheets

METHOD OF MANUFACTURING A LENS FOR USE AS A PART OF AN AIRCRAFT

CROSS-REFERENCE TO RELATED APPLICATIONS

This is a continuation-in-part of copending U.S. patent application Ser. No. 07/791,881 filed on Nov. 13, 1991 now abandoned.

BACKGROUND OF THE INVENTION

This invention relates to the method of manufacturing a lens for use in an aircraft, such as a lens cover for a navigation light that may typically be placed at an aircraft wing tip. Lenses for use in aircraft have three demanding basic requirements. First, the lens must be exceedingly strong to sustain the impact from hail, foreign objects, etc. and thermal shock to which a lens on an aircraft is subjected, especially to which a lens on a modern high-speed jet aircraft is subjected. Second, an aircraft lens typically is of a complex configuration to meet the aerodynamic requirements of an aircraft exterior design. A third requirement is that the lens must be highly transparent to permit a substantial portion of light from a light source to pass therethrough and therefore must resist the erosion effects of ice crystals, sand and rain.

Lenses for aircraft application are typically manufactured of plastic material, such as polycarbonate, acrylic or the like. A lens is made by first forming a pattern in a sheet of base translucent material. The pattern, after being cut to its prescribed dimensions in the form of a flat blank member, is then molded, formed and contoured into the desired ultimate configuration. After the configuration of the lens is formed, the edge is finished to match the requirements of the lens to fit in its location within a lens receptacle of an aircraft.

Since aircraft lenses typically must be formed in contoured aerodynamic shapes, there is a tendency to develop stress in the edge of the lenses when the lenses are mounted to an aircraft, and failure of aircraft lenses typically begins with cracks forming in an edge of the structure.

The main objective of this disclosure is to provide an improved method of manufacturing a lens for use on an aircraft that resists erosion from hail, sleet, sand and the like and that also resists cracks, from thermal excursions, originating at the lens edge.

SUMMARY OF THE INVENTION

This invention provides a method of manufacturing a lens for use as a part of an aircraft.

To form a lens according to the principles of this invention it is first necessary to form a laminate in a flat sheet which is subsequently used in configuring the aircraft lens. To successfully form a laminate, a clean room facility must be available and an autoclave capable of reaching temperatures up to about 400° F. and pressures up to about 150 psi. A blank of flat sheet of polycarbonate material, such as LEXAN polycarbonate, having a thickness of about 0.25 inches and a flat sheet of comparable size of acrylic material having a thickness of about 0.06 inches are obtained. The blank of acrylic must be dried at about 150° F. for about 48 hours and the polycarbonate dried at about 260° F. for 48 hours. If the acrylic and polycarbonate blanks are not to be used within eight hours or so after drying, they should be stored in a vacuum or in a chamber having humidity of 15 or less. When cutting the acrylic and polycarbonate blanks the corners are rounded and smoothed using sandpaper.

The polycarbonate and acrylic blanks are laminated together using a fusion bonding process. A sandwich is formed utilizing two sheets of tempered glass that function as buffers, the tempered glass sheets being about 0.5 inches in thickness. The sandwich is composed of a glass buffer, a polycarbonate sheet, an acrylic sheet and a glass buffer. The prepared sandwich is placed in a vacuum bag and the bagged material is then placed in an autoclave.

The autoclave temperature is set to about 380° F., plus or minus 10° F., and to a pressure of about 100 psi, plus or minus 10 psi. After the above pressure and temperature are reached, which will require about ½ hour, the cycle is held for two hours. Thereafter, the autoclave is permitted to cool to less than 130° F. and the autoclave pressure released. The sandwich is permitted to cool to room temperature and removed from the vacuum bag. The glass buffers are removed, leaving the polycarbonate and acrylic fusion bonded to each other.

The laminate has many characteristics that are advantages in forming an aircraft lens compared to the use of a single material of either polycarbonate or acrylic. Polycarbonate has the advantage of being tough, strong and resistent to fatigue or thermal failure. On the other hand, the exterior surface of a lens formed solely of polycarbonate tends to cloud or become opaque when subject to erosion caused by hail, sleet, sand, etc. encountered by high-speed aircraft. Acrylic, on the other hand, is more resistant to becoming clouded or opaque but does not have the toughness and resistance to fatigue failure or thermal cracking as does polycarbonate. The acrylic layer also reduces oxidation and moisture absorption of the polycarbonate, both of which are responsible for service life degradation of the material. Therefore, the lamination takes advantage of the best characteristics of each of these materials.

After the laminate of polycarbonate and acrylic is formed, the flat sheet is cut to the pattern required to form the lens to fit the aerodynamic requirements of the aircraft on which the lens is to be used. The sheet of laminate of the required pattern is then heated and contoured on a mold to form the shape of the required lens, with the acrylic on the outside surface. After the shaped lens is cooled and removed from the mold, the basic lens having a desired size and configuration and having an uninterrupted circumferential edge is provided.

A seal is then affixed to the circumferential edge on the lens inner surface. The seal may be formed of synthetic rubber of, by way of example, 1/32 inch thickness and about 1 inch in width.

After the seal has been applied to the lens circumferential edge, the edge is trimmed to the desired ultimate configuration, attachment holes are drilled and bushings installed therein. The lens is then ready for use in an aircraft.

A better understanding of the invention will be obtained from the attached specification and claims, taken in conjunction with the attached drawings.

DESCRIPTION OF THE PREFERRED EMBODIMENT

Figure 3:
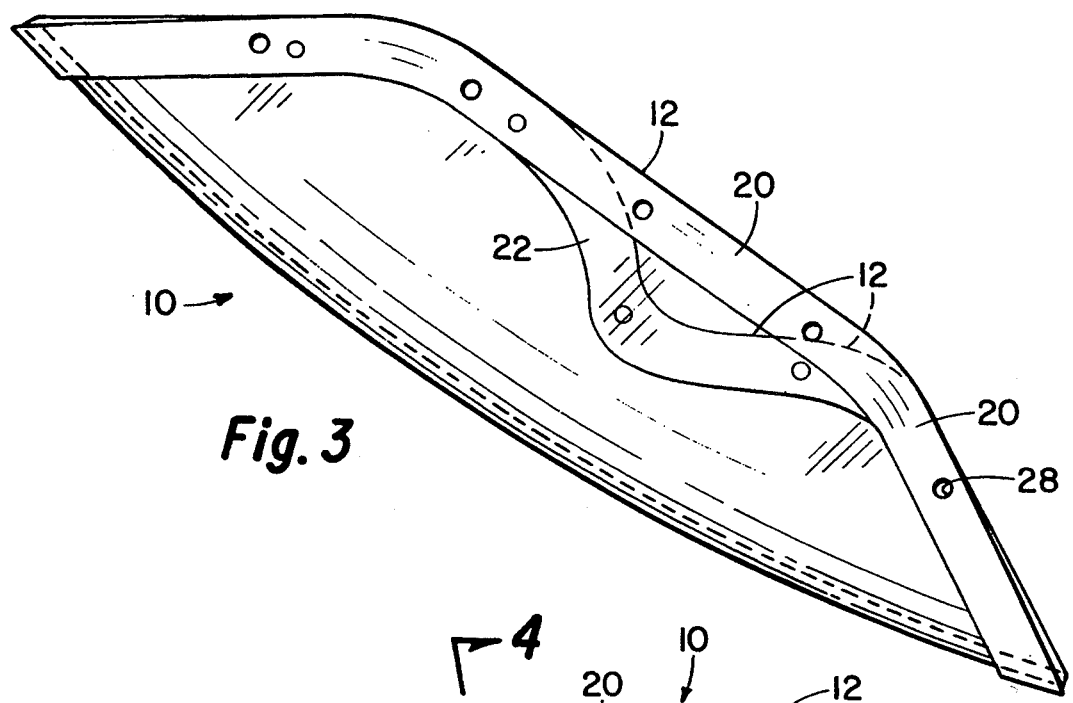
FIG. 3 is a view taken along the line 3—3 of FIG. 1 looking down on the lens of FIG. 1.
Figure 1:
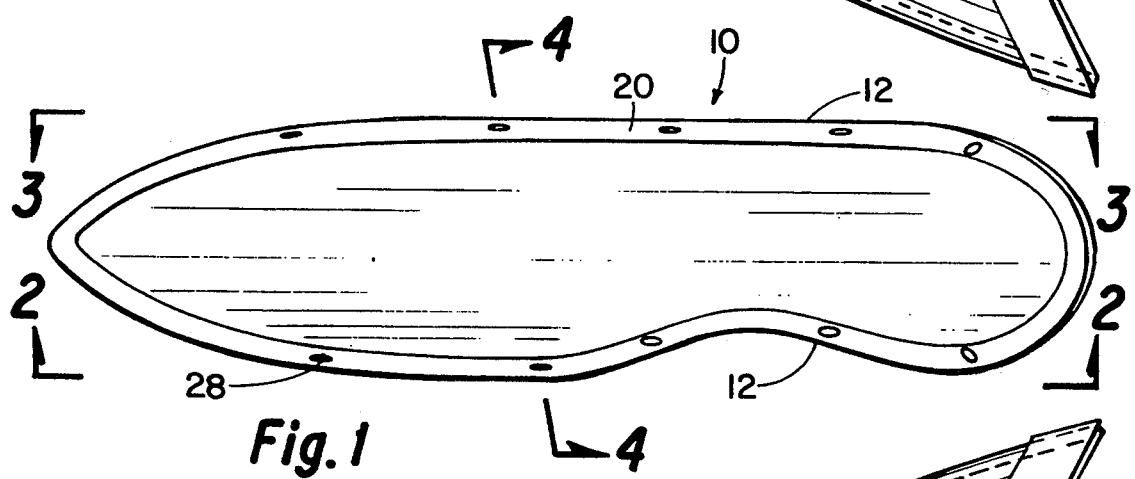
FIG. 1 is an elevational view of a lens for use in an aircraft manufactured according to the method of this invention.
Figure 2:
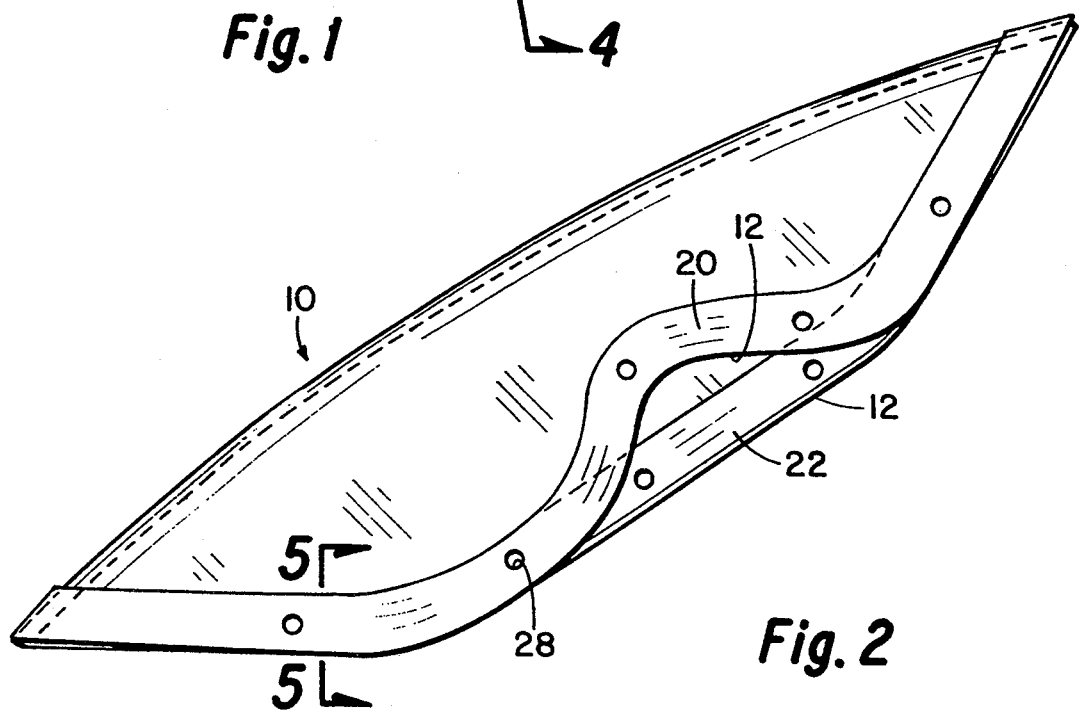
FIG. 2 is a view taken along the line 2—2 of FIG. 1 looking up on the lens of FIG. 1.

Referring to the drawings and first to FIGS. 1, 2 and 3, a typical lens manufactured according to the method of this invention is illustrated.

The lens as illustrated in the drawing is formed in the manner as described in the summary of the invention, that is, a laminate is first formed by fusion bonding of a sheet of polycarbonate and a sheet of acrylic in an autoclave subjected to heat and pressure. The flat sheet of laminate after being removed from the autoclave is cut to the lens configuration to form a pattern. The pattern is heated and formed with a mold to obtain the configuration of the lens having the shape as shown in FIGS. 1, 2 and 3 of the drawings. Lens body 10, as previously described, is a laminate in which the inner layer 10A is polycarbonate of typically about 0.24 inches thick and the outer layer of the laminate 10B is acrylic of about 0.06 inches thick. The total thickness may vary and the ratio may vary, but typically the acrylic is of thickness of about $\frac{1}{4}$ that of the polycarbonate.

As shown in FIGS. 1, 2, and 3 a typical lens for use in an aircraft is a complex irregular item. The complexity of the shape is required by virtue of the fact that a lens must fit and conform to the exterior configuration of the aircraft and must meet the aerodynamic requirements of the aircraft. The lens of the type shown in FIGS. 1, 2 and 3 is typical of the shape of lenses employed for an aircraft wing tip navigational light, however, the method of this invention is not related to the specific ultimate configuration of the lens. The lens illustrated in FIGS. 1, 2 and 3 is given by way of example only and to illustrate the unique requirements of transparent coverings that are formed for aircraft lenses.

The lens body 10 has an uninterrupted circumferential edge 12 extending around the full perimeter of the lens. It has been learned that in constructing lenses of the type illustrated in FIGS. 1, 2 and 3, the propensity for failure typically occurs due to the fatigue caused by stresses induced in the lens body at the time of installation and from thermal stress. An object of this disclosure is to provide an improved lens having improved resistance to clouding caused by the impact of hail, sleet, sand, etc. and improved resistance to environmental failure, and particularly to improved resistance to the formation of cracks occurring at the lens periphery or edge 12.

Resistance of the clouding of the lens is achieved by providing a lens formed of a laminate in which the outer surface is acrylic, as previously described.

Figure 4:
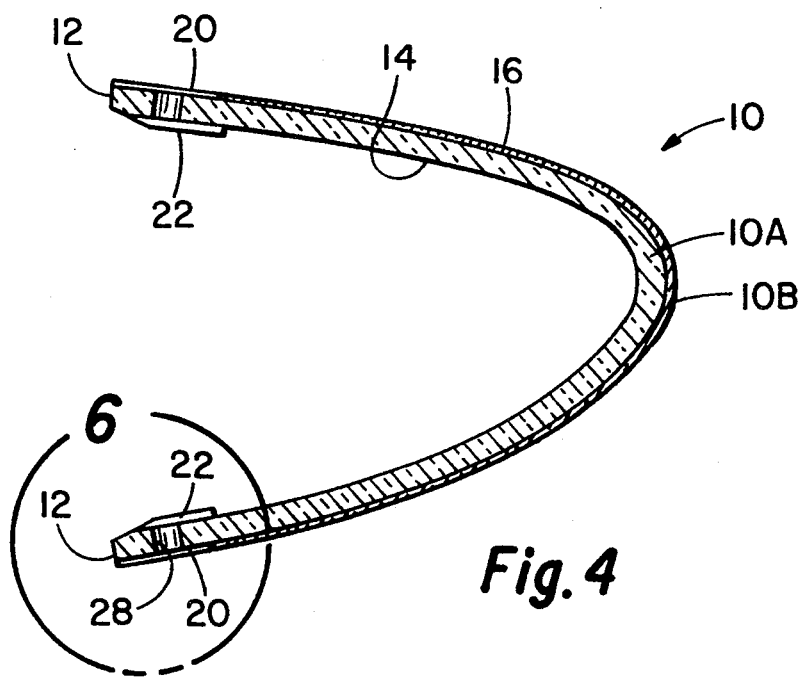
FIG. 4 is a cross-sectional view of the lens of FIG. 1 taken along the line 4—4 of FIG. 1.

As shown in FIG. 4, lens body 10 has an interior surface 14 and an exterior surface 16. Affixed to the interior surface 14 is a retainer strip 18. Such retainer strip may be of width from about $\frac{3}{4}$ to 1 inch and extends around the full interior edge 14 of the lens body. The retainer strip 18 is formed of glass fiber cloth that may, for example, have Mil Spec Mil-C-9084, Type B, and is available from M.C. Gill Corporation. The retainer strip 18 is affixed to the lens inner surface 14 by means of a bonding agent.

In addition, a retainer strip 20 is secured around the entire peripheral edge 12 of the lens on the exterior surface 16. Like retainer strip 18, retainer strip 20 on the exterior surface is preferably formed of glass fiber cloth and may be, by example, about $\frac{3}{4}$ to 1 inch wide, although the width can vary. The retainer strip 20 is secured to the lens body exterior surface 16 with a bonding agent as previously mentioned.

It has been shown that glass fiber cloth retainer strips 18 and 20, when securely bonded to the edges of the lens body, serve to substantially strengthen the lens body and reduce the tendency to the formation of cracks in the lens body as originating from the lens edge 12.

The retainer strips 18 and 20 may be of single ply or may be of two ply thickness. When a first retainer strip is applied using the bonding material thereafter bonding material is applied to the exterior surface of the first strip and a second ply of the retainer strip is applied. Obviously, more than two plies can be employed if desired, however, it has been determined that normally two plies of the glass fiber cloth retainer strips is sufficient to provide the structural reinforcement of the lens body edge.

After retainer strips have been applied, it is normally necessary to provide a seal for the peripheral edge of the lens body. This is accomplished by affixing a seal strip 22 around inner surface 14 and around the entire periphery of the lens. The seal 22 may be formed as an elongated strip of synthetic rubber of a width such as about 1 inch and a thickness of about 1/32 of an inch. The seal is applied by bonding material, such as rubber adhesive or thin, double back tape as available from 3M. The seal strip 22 is applied directly over retainer strip 18.

Figure 6:
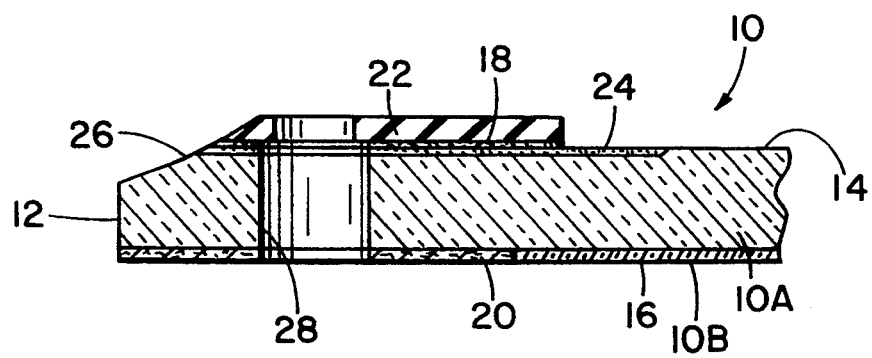
FIG. 6 is a cross-sectional view as in FIG. 5 but showing the cross-section taken in the area of the lens having an opening therethrough and showing an alternate arrangement wherein undercut of the lens body is provided to meet application limitations.
Figure 5:
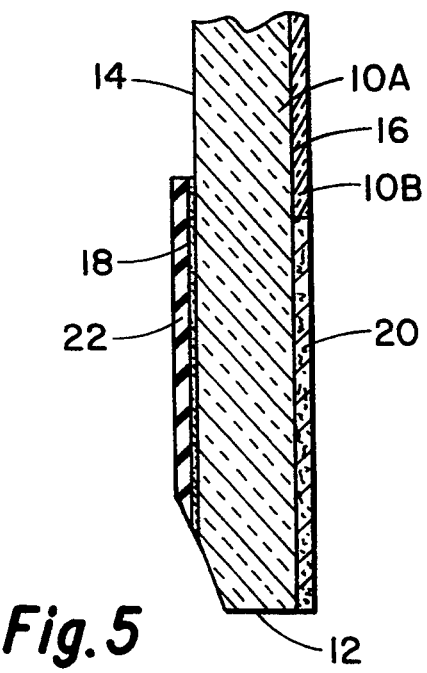
FIG. 5 is an enlarged partial cross-sectional view taken along the line 5—5 of FIG. 2 showing an edge construction of the lens.

In order to comply with the mounting requirements of the lens and to accommodate the increased thickness of the edge of the lens by the application of reinforcing retainer strips 18 and 20 to the inner and outer surfaces and in addition seal strip 22, it may be necessary, as shown in FIG. 6, to undercut lens body 10 in the area thereof that receives strip 18. The undercut is indicated by the numeral 24 and is of a thickness necessary to offset, at least in part, the thickness of retainer strip 18. The use of an undercut in lens 10 may be particularly important when the lens is being manufactured as a replacement item, that is, to replace a lens in which the lens holder was not designed to accept a lens having the reinforced edge as provided by the method herein.

After retainer strips 18 and 20, and seal strip 22 are applied, edge 12 of the lens is finished to final form. Such finishing may include tapering 26 and when such is required, retainer strip 18 and seal strip 20 are shaped to conform to the ultimately desired configuration of the lens edge.

The lens as herein described has increased strength and service life and in a way which does not diminish the light transparency characteristics of the lens.

In order to secure the lens in position, retention members such as screws, bolts, rivets, etc. are employed and for that reason, openings 28 are formed in the lens around the peripheral edge. Such openings pass through retainer strips 18 and 20 and seal member 22, as shown in FIG. 6.

Figure 7:
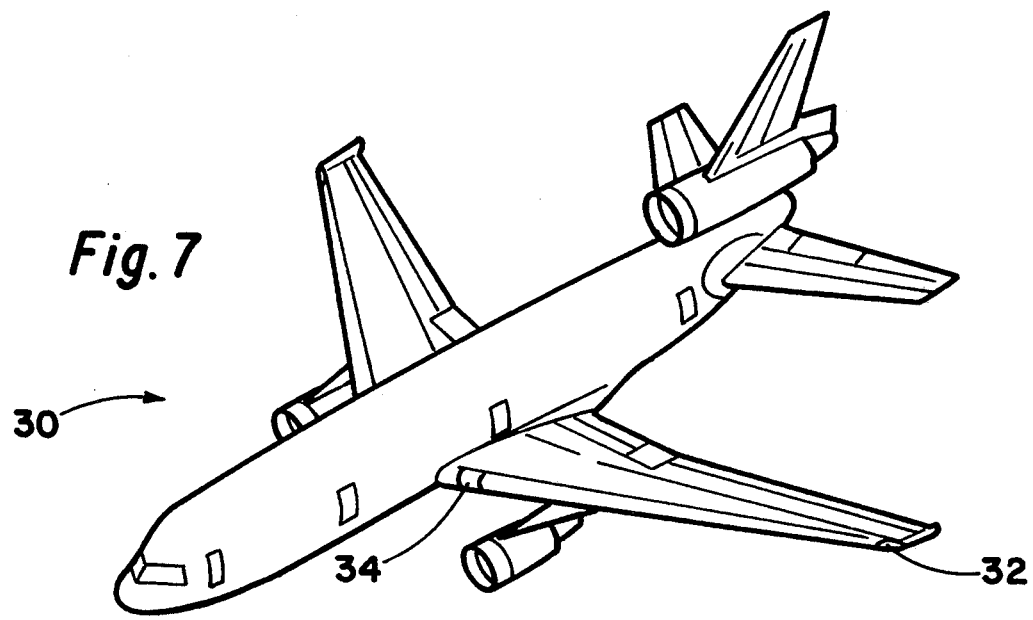
FIG. 7 is an isometric projection of an aircraft illustrating typically wing tip and landing light lens positions.

FIG. 7 is a picture of an aircraft 30 which illustrates two locations 32 and 34 on the aircraft 30 where lens bodies 10 may be employed. First, lens bodies 10 may be employed in a wing tip location 32 in order to cover a wing tip light (not illustrated). Second, lens bodies 10 may be employed in a landing light lens position 34 in order to cover a landing light (not illustrated).

Figure 8:
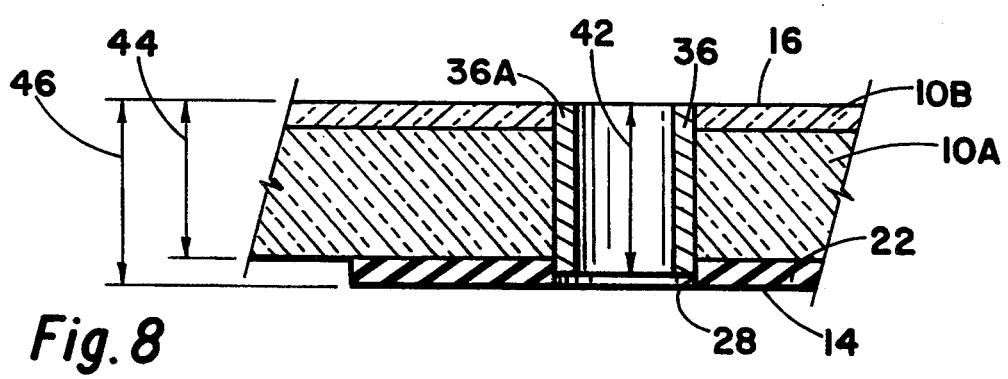
FIG. 8 is a partial cross-sectional view similar to FIG. 6 illustrating another embodiment which employs a straight sided bushing in each of the mounting openings as a means of securing the lens to an aircraft.

An alternate embodiment of the present invention is shown in FIG. 8. In this embodiment, the polycarbonate 10A is fusion bonded with the acrylic 10B forming a laminate. The laminate is then cut and formed into a lens body 10, as previously described above. Next, instead of securing the interior retainer strip 18 and the exterior retainer strip 20 at the edge 12 of the interior and exterior surfaces 14 and 16 respectively, the seal strip 22 is instead directly affixed to the interior surface 14 of the edge 12. The seal strip 22 is applied by bonding material, such as rubber adhesive or thin, double back tape such as available from 3M. The seal strip 22 is applied directly over the interior surface 14 of the edge 12.

After the seal strip 22 is applied, the edge 12 of the lens body 10 is finished to final form. Although not illustrated in FIGS. 8–10, such finishing may include providing a taper 26 on the edge 12 similar to the taper 26 illustrated in FIG. 6. When a taper 26 is required, the seal strip 22 is shaped to conform to the ultimate desired configuration of the edge 12 of the lens body 10.

Figure 9:
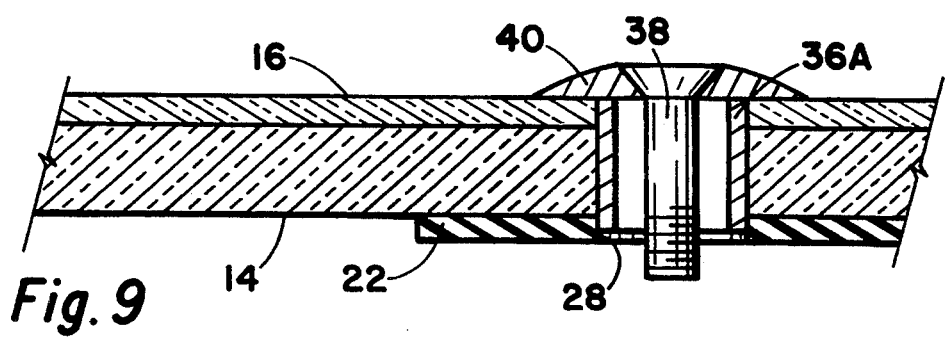
FIG. 9 is a cross-sectional view similar to FIG. 8 illustrating use of a domed washer in conjunction with a retention member which extends through the straight bushing in order to secure the lens to an aircraft.
Figure 10:
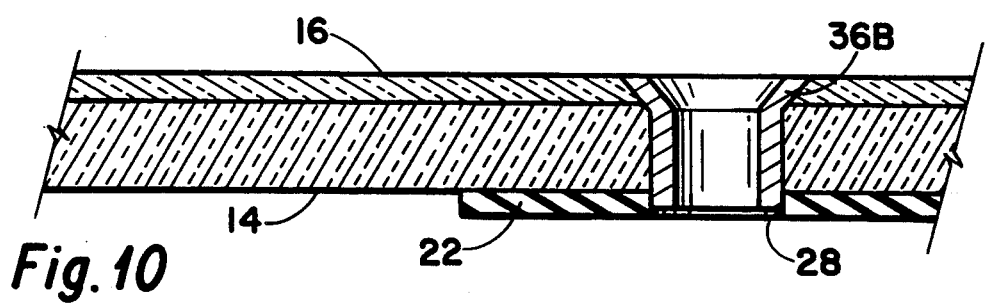
FIG. 10 is a cross-sectional view similar to FIG. 8 illustrating use of a countersunk bushing in each of the mounting openings as a means of securing the lens to an aircraft.

Next, openings 28 are formed in the peripheral edge 12 of the lens body 10 and rigid bushings 36 are installed therein. FIGS. 8 and 9 illustrate use of a straight sided bushing 36A, whereas, FIG. 10 illustrates use of a countersunk bushing 36B.

When the straight sided bushing 36A is employed with a retention member 38, such as a screw, bolt, rivet, etc., it is generally desirable to employ a domed washer 40. The domed washer 40 abuts the exterior surface 16 to prevent the retention member 38 from slipping through the straight sided bushing 36A as the retention member 38 is torqued down to secure the lens body 10 to the aircraft 30.

The bushings 36A and 36B each have a bushing length 42, as illustrated for the straight sided bushing 36A. It is important that the bushing length 42 slightly exceed a laminate depth 44 of the polycarbonate 10A and the acrylic 10B at the edge 12 where the bushing 36 is installed. Also, it is important that the bushing length 42 not exceed a laminate plus seal depth 46, also measured at the edge 12 where the bushing 36 is installed. The laminate depth 44 is a distance measured perpendicularly between the interior and exterior surfaces 14 and 16 at the edge 12. The laminate plus seal depth 46 is a distance measured perpendicularly between the exterior surface 16 and an unsecured outwardly oriented face of the seal strip 22.

Because the bushing depth 42 exceeds the laminate depth 44, when the retention member 38 is torqued up in order to mount the lens body 10 to the aircraft 30, the retention member 38 exerts a compressive force on the rigid bushing 36 instead of on the plastic lens body 10. In general, compressive loads due to the torque-up of retention members 38 appear to be a significant, if not the major, cause of lens cracking. Thus, by providing bushings 36 in the mounting openings 28 in order to receive compressive stress loads exerted by the retention members 38, lens cracking in the lens body 10 can be reduced, thus extending the useful service life of the lens body 10.

At the same time, the bushing length 42 is less than the laminate plus seal depth 46, thus, causing the flexible seal strip 22 to be compressed as the retention members 38 are torqued up. This compression of the seal strip 22 forms a weather-tight seal between the lens body 10 and the aircraft 30 without creating significant stress on the lens body 10.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of manufacturing a lens for use as a part of an aircraft comprising:
    cutting a sheet of a laminate of acrylic and polycarbonate of selected thickness into a blank having a configuration required by the ultimate lens configuration;
    heating the blank and forming it around a mold to provide a three dimensional lens body of desired size and configuration having an uninterrupted circumferential edge;
    applying a narrow strip seal of compressible material and of selected thickness on said lens body inner surface adjacent substantially the full circumferential edge of said lens body;
    forming spaced apart openings in said lens body adjacent said circumferential edge, such openings passing through said strip seal; and
    inserting a bushing in each of said openings in said lens body and said strip seal, each bushing having a length greater than the thickness of said lens body and less than the thickness of said lens body and said strip seal.

2. A method of manufacturing a lens for use as a part of an aircraft according to claim 1 wherein said sheet of a laminate of polycarbonate and acrylic includes the step of cutting a sheet of laminate formed by fusion bonding a sheet of acrylic and a sheet of polycarbonate.

3. The method of manufacturing a lens according to claim 2 wherein said step of fusion bonding includes placing an acrylic sheet and a polycarbonate sheet between buffers forming a sandwich, the sandwich being subjected to elevated heat and pressure in an autoclave.

4. The method of manufacturing a lens according to claim 3 wherein said sandwich is heated to a temperature of about 380° F. and a pressure of about 100 psi in said autoclave for about 2 hours.

5. The method of manufacturing a lens according to claim 3 wherein said sandwich is placed in a vacuum bag and the vacuum bag having said sandwich therein is placed in said autoclave.

6. The method of manufacturing a lens according to claim 3 wherein the thickness of said acrylic sheet is about ¼ the thickness of said polycarbonate sheet.

7. The method of manufacturing a lens according to claim 6 wherein said acrylic sheet is about 0.060 inches thick and said polycarbonate sheet is about 0.240 inches thick.

8. The method of manufacturing a lens according to claim 1 wherein said step of applying a narrow strip seal to said lens body comprises applying a narrow strip of synthetic rubber sheet.

9. The method of claim 8 wherein said step of applying a narrow strip of synthetic rubber sheet comprises applying such sheet having thickness of about 1/32 inch.

10. The method of manufacturing a lens according to claim 1 wherein said bushing is straight sided.

11. The method of manufacturing a lens according to claim 1 wherein the bushing is countersunk in order to receive a head of a retention member.

* * * * *